(12) United States Patent
Behrens et al.

(10) Patent No.: US 12,171,168 B2
(45) Date of Patent: Dec. 24, 2024

(54) BELT

(71) Applicants: ContiTech Transportbandsysteme GmbH, Hannover (DE); Pöttinger Landtechnik GmbH, Grieskirchen (AT)

(72) Inventors: Carsten Behrens, Hannover (DE); Christian Lackner, Grieskirchen (AT); Wolfgang Prechtl, Grieskirchen (AT); Alois Voraberger, Grieskirchen (AT)

(73) Assignee: Contitech Transportbandsysteme GmBH, Hannover (DE)

( * ) Notice: Subject to any disclaimer, the term of this patent is extended or adjusted under 35 U.S.C. 154(b) by 166 days.

(21) Appl. No.: 17/620,003

(22) PCT Filed: Jun. 15, 2020

(86) PCT No.: PCT/EP2020/066433
§ 371 (c)(1),
(2) Date: Dec. 16, 2021

(87) PCT Pub. No.: WO2020/254223
PCT Pub. Date: Dec. 24, 2020

(65) Prior Publication Data
US 2022/0361415 A1    Nov. 17, 2022

(30) Foreign Application Priority Data
Jun. 18, 2019 (DE) .................. 10 2019 208 827.9

(51) Int. Cl.
*A01F 15/07* (2006.01)
*A01F 15/18* (2006.01)
*F16G 3/00* (2006.01)

(52) U.S. Cl.
CPC .............. *A01F 15/18* (2013.01); *A01F 15/07* (2013.01); *F16G 3/00* (2013.01)

(58) Field of Classification Search
CPC .... A01F 15/07; A01F 15/18; A01F 2015/183; A01F 2015/0795; A01F 2015/077;
(Continued)

(56) References Cited

U.S. PATENT DOCUMENTS 14,213 A  *  2/1856  Whiteley ............... F16G 3/00
                                          24/35
3,744,095 A  *  7/1973  Tomlinson ........... F16G 1/28
                                          24/33 K
(Continued)

FOREIGN PATENT DOCUMENTS

AT     199443 B     9/1958
DE   2251454 A1    11/1973
(Continued)

OTHER PUBLICATIONS

International Search Report for PCT/EP2020/066433, Mailed Sep. 15, 2020, 5 pages.
(Continued)

*Primary Examiner* — Jimmy T Nguyen
(74) *Attorney, Agent, or Firm* — Lippes Mathias LLP (57) ABSTRACT

A belt (1) with a first belt end (11) and a second belt end (12), both belt ends (11, 12) being connected together. The first belt end (11) has at least one first segment (13) and a second segment (14), and the second belt end (12) has at least one first segment (15) and a second segment (16). The first segment (13) of the first belt end (11) is connected to the first segment (15) of the second belt end (12) at least one connection element (17), and the second segment (14) of the first belt end (11) is connected to the second segment (16) of the second belt end (12) at least one other connection element (17). The first segment (13) of the first belt end (11) is offset in the longitudinal direction (X) in some sections relative to the second segment (14) of the first belt end (11), and the first segment (15) of the second belt end (12) is offset (Continued)

in the longitudinal direction (X) in some sections relative to the second segment (16) of the second belt end (12).

21 Claims, 4 Drawing Sheets

(58) Field of Classification Search
CPC ..... B30B 5/04; F16G 3/00; F16G 3/04; F16G 3/16; B29C 66/4324; Y10T 428/192; Y10T 24/1636; Y10T 24/162; A01D 57/20

See application file for complete search history.

(56) References Cited

U.S. PATENT DOCUMENTS

| | | | |
|---|---|---|---|
| 3,988,940 A | 11/1976 | Szonn et al. | |
| 5,415,913 A | 5/1995 | Clevenger, Jr. | |
| 6,675,853 B2 * | 1/2004 | Shaffer | B29C 66/4324 |
| | | | 156/583.1 |
| 7,344,020 B2 * | 3/2008 | Grywacheski | A01D 61/02 |
| | | | 198/844.2 |
| 9,683,630 B2 * | 6/2017 | Vollbarth | F16G 1/28 |
| 2006/0278499 A1 | 12/2006 | Grywacheski et al. | |
| 2013/0032047 A1 | 2/2013 | Marques et al. | |

FOREIGN PATENT DOCUMENTS

| | | |
|---|---|---|
| DE | 202006008946 U1 | 8/2006 |
| DE | 102011003727 A1 | 8/2012 |
| EP | 2695512 A1 | 2/2014 |

OTHER PUBLICATIONS

Office Action for German Application No. 10 2019 208 827.9, dated Feb. 12, 2020, 7 pages.

* cited by examiner

BELT

BACKGROUND OF THE INVENTION

The present invention relates to a belt with a first belt end and a second belt end connected to each other. In addition, the invention relates to a belt system comprising such a belt.

In agriculture, so-called round balers are used to press stalk-shaped crops into bales. For this purpose, the crop is conveyed into the baling chamber and pressed into a cylindrical bale by surrounding pressing means such as pressing belts, the bale then being dispensed onto the field when it reaches a given size. Such round balers are known, for example, from DE 10 2011 003 727 A1, EP 2 695 512 A1, U.S. Pat. Nos. 3,964,246 A and 5,415,913 A. Such round balers with variable baling chambers, also referred to as pressing chambers, are preferably used in the agricultural sector, but are also fundamentally suitable for round-baling any fibrous material, such as waste, film or fabric residues in the field of disposal engineering.

Pressing belts usually comprise a linear or flat tension member embedded in an elastomer, which takes on the task of rotating the bale while simultaneously compressing the outer material layers on the rotating bale core. Especially, flat textiles as well as steel ropes running in the direction of movement can be used as tension members. The pressing belts can be manufactured open and then closed, for example by means of mechanical connection elements, for example in an interlocking or also frictionally engaged manner, see for example U.S. Pat. No. 5,415,913 A or also DE 20 2006 008 946 U1. Alternatively, the pressing belts can also be manufactured already closed. In operation, the pressing belts are in any case closed endlessly and run parallel to each other.

The pressing belts are used in such a way that the pressing belt or belts, by rotating in the baler by means of roller guidance, sets or set a "core", previously fed by the material pick-up of the round baler, into rotation (starting process) and in the further course continuously presses or press the material further fed via the pick-up cylinder of the pressing chamber onto the core, already rotating by means of the pressing belt or belts, as a material layer. Common pressing chambers generally have a width of approximately 1.2 m with usual belt lengths of approximately 10 m to approximately 15 m. Over this endless length, the same belts are guided over a press-specific number of rollers or cylinders, the average number of which is twelve. The belt or belts runs or run usually at a speed of approximately 3 m/s. The one or more belts are usually guided here laterally by the use of rigid lateral guide elements, see for example DE 10 2011 003 727 A1, EP 2 695 512 A1 and U.S. Pat. No. 3,964,246 A.

A belt made of elastic belt material and tension member reinforcements is known from document DE 2 251 454 A.

From the document AT 199443, a drive belt in the form of a flat or V-belt comprising at least one fibre-oriented plastic belt and, connected thereto, at least one running belt made of a tension-resistant, adhesive material is known.

Within today's round balers, usually only one belt is used in a mono-belt baler, and up to six belts in other round balers. The particular belt width with full-surface formation of the pressing surface by the one or more belts can be determined here approximately as a quotient of the pressing chamber width and the number of belts present in the round baler. The belts are usually driven here frictionally by means of at least one drive cylinder.

It is known that comparatively wide round baler belts with widths of significantly more than approximately 220 mm and lengths of more than approximately 14 m fail more frequently than narrower round baler belts when a continuous hook connector solution is used as intended.

One cause of this can often be seen as a build-up of pressing material on individual rollers or roller areas of the round baler. This material build-up can result in transverse buckling of the connection during drum rotation, which can lead to failure of the connection.

Also, compared to classic conveyor belt applications, which run over comparatively long lengths via a fixed arrangement of rollers, a round baler has a comparatively short pressing belt as well as a significantly larger number of rollers, which are also partially movable to enable the round bale to be built up. This means that the round bale pressing belt is subjected to a comparatively high number of load changes. The rollers of a round baler also have comparatively small diameters. Especially, the short length and the high number of deflection points within the round baler can lead to insufficient compensation of the elongation of the pressing belt to compensate for the externally effected additional elongation, also in the case of a possible skewed connection within the belt.

These two effects can therefore lead to local dynamic load peaks, the effect of which can represent a significant reduction in the dynamic joint strength.

To avoid or reduce such dynamic load peaks, narrower belts have been used so far. Attempts can also be made to make the connection itself more flexible, for which purpose more flexible rope connectors can be used instead of stiff rod connectors.

However, such rope solutions have other disadvantages, including increased hook wear, since the rope as a connection element can act like a saw or file on the hook connectors and can thus lead to a different type of connection failure. In addition, the problem of local load peaks in the hook connection during drum rotation is also not effectively solved.

Alternatively, an integrally bonded connection can be used to close the pressing belt. For this purpose, the ends can be placed on top of each other heightwise and joined together, for example by gluing or by vulcanisation. In the latter case especially, the width of the connection point can depend on the size of the tool, which can be a heating tool in the case of heating vulcanisation. Thus, the maximum width of the pressing belt is determined by the maximum length of the heating tool in the transverse direction of the pressing belt and is thus limited. The installation situation of the pressing belt within the press during assembly can also depend heavily on the distances between the permanently installed rollers themselves and can thus also restrict this.

SUMMARY OF THE INVENTION

It is an aim of the present invention to provide a belt of the type described at the outset with improved service life. Especially, this is to be achieved for belts of round balers. This is to be achieved as simply and/or inexpensively as possible. At least one alternative to known belts of this kind is to be provided.

In accordance with a first aspect of the invention, the aim is addressed by a belt having the features a first belt end and a second belt end. The two belt ends are connected to each other. The first belt end has at least one first segment and one second segment. The second belt end has at least one first segment and one second segment, wherein the first segment of the first belt end is connected to the first segment of the second belt end by at least one connection element. The second segment of the first belt end is connected to the second segment of the second belt end at least one further connection element. The first segment of the first belt end is arranged offset in some sections in a longitudinal direction relative to the second segment of the first belt end and in the longitudinal direction relative to the second segment of the second belt end. The first segment of the first belt end and the second segment of the first belt end are separated from one another in a transverse direction by a material interruption and/or the first segment of the second belt end and the second segment of the second belt end are separated from one another in the transverse direction by a material interruption.

In accordance with a second aspect of the invention, the aim is addressed by a belt having the features a first end and a second belt end. The two belt ends are connected to each other. The first belt end has at least one first segment and one second segment. The second belt end has at least one first segment and one second segment. The first segment of the first belt end is connected to the first segment of the second belt end by at least one connection element and the second segment of the first belt end is connected to the second segment of the second belt end by at least one further connection element. The first segment of the first belt end is arranged offset-free in a longitudinal direction relative to the second segment of the first belt end. The first segment of the second belt end is arranged offset-free in longitudinal direction relative to the second segment of the second belt end. The first segment of the first belt end and the second segment of the first belt end are separated from one another in a transverse direction by a material interruption, and/or the first segment of the second belt end and the second segment of the second belt end are separated from one another in a transverse direction by a material interruption.

In accordance with a third aspect of the invention, the aim is addressed by a belt system, preferably by a round baler, having the features according to the first aspect of the invention.

BRIEF DESCRIPTION OF THE DRAWINGS

Two exemplary embodiments relating to the first aspect of the invention, one exemplary embodiment relating to the second aspect of the invention and further advantages of the invention are explained below in conjunction with the following figures. These show.

The above figures are described in Cartesian coordinates with a longitudinal direction x, a transverse direction Y oriented perpendicularly to the longitudinal direction X and a vertical direction Z oriented perpendicularly to both the longitudinal direction X and the transverse direction Y. The longitudinal direction X can also be referred to as depth X, the transverse direction Y can also be referred to as width Y and the vertical direction Z can also be referred to as height Z.

DETAILED DESCRIPTION OF THE INVENTION

A belt is understood to be an endless closed or closable flexible belt for force transmission, which can also be generally described as a band. Depending on the application, a belt can also be referred to as a drive belt, conveyor band, conveyor belt and, especially, as a pressing belt or round-baler pressing belts. A belt can also be a belt segment, which can be connected to at least one other belt segment and, if necessary, closed endlessly.

Thus, in accordance with the first aspect, the present invention relates to a belt with a first belt end and a second belt end, wherein the belt ends are connected to each other.

As described at the outset, the two belt ends of such belts are usually connected to each other by means of a connection element that is continuous in the transverse direction. For example, a plurality of hooks can be used as a connection element, each of which can be bent for example approximately in a semi-circle shape, facing one another with their curvature. For example, the two open ends of a hook can engage in the material of the belt in the vertical direction from above and from below and thus hold the hook. The open ends of the hooks of both belt ends can then be consolidated, overlapping each other alternately, and can held interlockingly in the transverse direction by a rigid coupling element, such as by a rod, for example.

In this case, a dynamic breakage of the rigid connection element can occur due to increased alternating bending. Brittle fracture can also occur under the most extreme overload. Furthermore, individual hook tears can occur due to local overloading of individual hook segments during drum rotation, which can occur as a dynamic failure due to local overloading of individual hooks within the connection element.

Although these disadvantages can be avoided by using a rope as a coupling element, as described at the outset, they can lead to wear of the hooks for reasons other than described above and thus might not satisfactorily increase the service life of the belt or its connection point.

The belt according to the first aspect of the invention is characterised in that the first belt end has at least one first segment and one second segment and in that the second belt end has at least one first segment and one second segment, wherein the first segment of the first belt end is connected to the first segment of the second belt end by means of at least one connection element, and wherein the second segment of the first belt end is connected to the second segment of the second belt end by means of at least one further connection element, wherein the first segment of the first belt end is arranged offset in some sections in the longitudinal direction relative to the second segment of the first belt end, and wherein the first segment of the second belt end is arranged offset in some sections in the longitudinal direction relative to the second segment of the second belt end. More than two segments can also be formed per belt end.

A segment of a belt end is preferably understood to mean a tab formed by the belt and extending in the longitudinal direction. Thus, the tab in question may protrude longitudinally above the rest of the associated belt. Each segment preferably has a rectangular basic shape. In addition, each segment can have three outer edges. One of the outer edges can run in the transverse direction, and the other two outer edges can run in the longitudinal direction.

With the exception of the connection elements, the belt can be formed at least with or exclusively from a fibre-reinforced rubber material. In addition, it is preferred that the belt forms both the first belt end and the second belt end. The segments of the belt ends can thus also be formed by the belt. If the belt, with the exception of the connection elements, is preferably formed exclusively from the fibre-reinforced rubber material, then in this case the segments of the belt are also formed from the same fibre-reinforced rubber material.

Preferably, the segments of a belt end run parallel to each other in the longitudinal direction, but extend to different distances. The segments of the two belt ends that are opposite each other in the longitudinal direction are then connected to each other in each case with a separate connection element. In this way, the connection points of the various segments can be arranged offset to each other in the longitudinal direction, so that both connection points do not come into contact at the same time with a roller of a belt system on which the belt is used. This can distribute the introduction of forces into the belt in the longitudinal direction of the belt as well as the pulses that can result from a belt coming into contact with a roller. This can increase the service life of the belt.

The segments of a belt end can have different contours or courses, provided that this allows the segment ends opposite each other in the longitudinal direction of the belt to be connected to each other. As will be described in more detail below, the segments opposite each other in the longitudinal direction of the belt can be formed in a straight line in the transverse direction, so that especially a hook connection can be used as a connection element. However, the segment ends opposite each other in the longitudinal direction of the belt can also be formed obliquely, or in a serrated, corrugated, wedge-shaped or staggered manner and the like, so that especially an integrally bonded connection can be used, for example by gluing, by cold vulcanisation or by hot vulcanisation. This can increase the length of the connection and can thereby improve the stability and durability of the connection.

Especially, this can influence the orientation of the seam strip of the integrally bonded connection in relation to the running direction of the pressing belt, so that the seam strip only makes contact with the roller or detaches from the roller in a point-like fashion, for example when oriented at an angle to the running direction. This means that the pulses on the connection can be distributed over its length, which can also have a positive effect on the stability and durability of the connection.

The segmentation of the connection inclusive of the belt ends in itself enables a simple local deflection of the segments connected to each other in the longitudinal direction and thus an easier compensation of the elongation of the segments that are connected to each other in the longitudinal direction and deflect, i.e. turn away, as a result of the loading. This can lead analogously to a relief of the particular coupling element, especially when using a rigid connecting rod, and of the tensile load, which is transmitted for example via this rod between the individual hooks. This can increase the service life of the belt or its connection points.

It is also advantageous that the use of an additional frictional pairing between hook and rope provided by a rope connector can be avoided. In other words, a rigid coupling element such as a rigid rod can be used in each case, since its disadvantages described at the outset can be avoided or at least reduced by splitting the connection point. In this way, the disadvantages of a flexible coupling element such as a rope can be avoided.

It is also advantageous that the previously known and proven hook pressing technique with connector widths of up to approximately 220 mm can still be used for belts with a significantly larger overall width, since individual connection points of this width can be pressed.

For existing constructions of round balers with a reduced number of pressing belts and at the same time a larger pressing belt width of endlessly wound design, a technical solution can be offered in this way for the repair service possibly required in the field, for example in the event of belt damage due to external damage, both in terms of manufacturability and in terms of service friendliness, which can enable a replacement belt according to the invention to be inserted in the round baler without any major assembly effort. In addition, this can also enable the replacement of individual belts in an existing belt set in such a round baler.

The present invention can be applied to all types of belt, band and conveyor belt solutions that are subject to high stress, especially due to numerous load changes, and have an unfavourable width-to-endless length ratio, especially when the width-to-length ratio is significantly greater than 0.15, and can be advantageous there for the reasons described above. Especially, these advantages in round balers with variable pressing chamber by the use of pressing belts can be applied in the agricultural as well as in the waste sector.

For the belt according to the first aspect of the invention, it is also envisaged that the first segment of the first belt end and the second segment of the first belt end are separated from each other in the transverse direction by a material interruption and/or the first segment of the second belt end and the second segment of the second belt end are separated from each other in the transverse direction by a material interruption.

Preferably, at least one of the two belt ends facing each other or both belt ends facing each other are formed at least in two parts, so that each belt end has at least two segments arranged parallel to each other and extending at least substantially in the longitudinal direction. The segments of the two belt ends that lie opposite each other in the longitudinal direction are then connected to each other in each case with a separate connection element. More than two segments per belt end can also be formed by corresponding material interruptions.

The segments of a belt end are separated from each other in the transverse direction by a material interruption, which can be realised by a cut in the longitudinal direction through the material of the belt as well as by a material recess of this kind, which can also be referred to as a gap. The two connection elements are also separated from each other in the transverse direction, for which purpose the two connection elements can be formed separately and used independently of each other. Preferably, the connection between the two belt ends is divided into at least two or more individual segment regions separated from each other.

By means of such a material interruption, the segmentation of the connection together with the belt ends can improve a simple local deflection of the segments connected to each other in the longitudinal direction and the hereby facilitated elongation compensation of the segments connected to each other in the longitudinal direction and deflecting, i.e. turning away, as a result of the loading, since the connection elements are given a greater scope of movement by the material interruption. This can lead to an especially effective relief of the particular coupling element, especially when using a rigid connecting rod, and of the tensile load, which is transmitted for example via this rod between the individual hooks. This can further increase the service life of the belt or its connection points.

The belt according to the second aspect of the invention is characterised in that the two belt ends are connected to each other, wherein the first belt end has at least one first segment and one second segment, wherein the second belt end has at least one first segment and one second segment, wherein the first segment of the first belt end is connected to the first segment of the second belt end by means of at least one connection element, and wherein the second segment of the first belt end is connected to the second segment of the second belt end by means of at least one further connection element, and wherein the first segment of the first belt end and the second segment of the first belt end are separated from each other in the transverse direction by a material interruption and/or the first segment of the second belt end and the second segment of the second belt end are separated from each other in the transverse direction by a material interruption.

For the belt according to the second aspect of the invention, reference is made to the previous explanations, preferred features, effects and advantages at least in an analogous manner, as previously described for the belt according to the first aspect of the invention, with the exception of the explanations relating to the offset of the segments in the longitudinal direction. This is because the belt according to the second aspect of the invention is additionally characterised in that the first segment of the first belt end is offset-free in the longitudinal direction relative to the second segment of the first belt end, wherein the first segment of the second belt end is also offset-free in the longitudinal direction relative to the second segment of the second belt end.

The first and second segments of the first belt end can extend by the same distance in the longitudinal direction. They can therefore project the same distance in the longitudinal direction of the belt over the rest of the belt. If the two segments of the first belt end each have a rectangular basic shape, their segment ends facing away from the belt can be aligned with each other in the transverse direction. These segment ends are therefore not offset from each other in the longitudinal direction. Rather, they are arranged offset-free in the longitudinal direction.

For the first and second segment end of the second belt end, the previous, preferred explanations can apply at least in an analogous manner. For example, it is preferred that the first and second segments of the second belt end extend by the same distance in the longitudinal direction. In other words, they can project the same distance in the longitudinal direction of the belt over the rest of the belt. If the two segments of the second belt end each have a rectangular basic shape, their segment ends facing away from the belt can be aligned with each other in the transverse direction. These segment ends are therefore not offset from each other in the longitudinal direction. Rather, they are arranged offset-free in the longitudinal direction.

The segments of each of the two belt ends are separated from each other in the transverse direction by an associated material interruption. This means that the two connection elements are also separated from each other in the transverse direction. The two connection elements are therefore formed separately.

The segments at the belt ends and the separately formed connection elements ensure a simple local deflection of the segments connected to each other in the longitudinal direction and the hereby facilitated elongation compensation of the segments connected to each other in the longitudinal direction and deflecting, i.e. turning away, as a result of the loading, since the connection elements are given a greater scope of movement by the material interruption. This can lead to a especially effective relief of the particular coupling element, especially when a rigid connecting rod is used, and of the tensile load, which is transmitted for example via this rod between the individual hooks. This can further increase the service life of the belt or its connection points.

According to an advantageous embodiment of the belt in accordance with the first aspect of the invention, the connection element between the first segments of the two belt ends is arranged offset in the longitudinal direction by a predetermined amount relative to the connection element between the second segments of the two belt ends. In this way, the previously described properties of an offset arrangement of the two connection points can be achieved in a predetermined and thus defined manner.

According to a further advantageous embodiment of the belt according to the first aspect of the invention, the offset in the longitudinal direction is selected in such a way that, when the belt is used on a belt system, only one connection element can ever be in contact with a roller of the belt system. In other words, the two connection points are sufficiently far apart from one another in the longitudinal direction so that one of the two connection points is always out of contact with a roller, even if the other connection point is currently in contact with a roller. Preferably, the two connection points or the two connection elements are not further apart from each other in the longitudinal direction than is necessary for this. In any case, the corresponding arrangement can be decided by a person skilled in the art depending on the application for which the belt is intended, as described above.

In this way, it can be ensured that the forces or pulses of a contact between a connection element or a connection point and a roller can only ever act on the connection element or on the connection point of one segment at a time, since at the same time the other segment arranged in parallel has continuous contact with the roller and thus no forces or pulses can act on its connection element or connection point. This can relieve the connection element that is in contact with the roller with regard to forces or pulses and thus promote its longevity.

According to an advantageous embodiment of the belt according to the first and/or second aspect of the invention, the two belt ends are connected to each other exclusively in the longitudinal direction. This can favour the transmission of force in the longitudinal direction as the direction of movement of the belt and can help to avoid forces acting in the transverse direction, which could lead to a skewing of the belt.

According to an advantageous embodiment of the belt according to the first and/or second aspect of the invention, the first segment of the first belt end is exclusively connected to the first segment of the second belt end and the second segment of the first belt end is exclusively connected to the second segment of the second belt end. In this way, a transmission of force in the transverse direction can be reliably excluded, so that the previously described deflection movements of the two segments connected to each other in the longitudinal direction can take place reliably and/or over the longest possible length in the transverse direction.

According to an advantageous embodiment of the belt according to the first and/or second aspect of the invention, the segments of the first belt end are separated from one another by a first material interruption, wherein the segments of the second belt end are separated from one another by a second material interruption. The first material interruption and the second material interruption can form a common material interruption. The common material interruption can thus extend from the first belt end to the second belt end. Due to the preferably separate design of the connection elements, the material interruption can also extend through an intermediate space between the connection elements. The common material interruption can thus form a common, continuous material interruption.

According to an advantageous embodiment of the belt according to the first and/or second aspect of the invention, the segments of the first belt end and the segments of the second belt end are separated from each other by a common material interruption. This can allow a material interruption over the entire length of the segments connected to each other in the longitudinal direction with respect to each other in the transverse direction. Especially, the deflection can take place over the entire length and can thus lead to the most effective compensation possible.

According to an advantageous embodiment of the belt according to the first and/or second aspect of the invention, the material interruption or interruptions is/are formed as a recess or recesses between the two belt ends. This can create an additional free space in the transverse direction, which can improve the deflection, so that the most effective compensation possible can take place.

According to an advantageous embodiment of the belt according to the first and/or second aspect of the invention, the first segment of the first belt end is arranged spaced apart from the second segment of the first belt end by the recess in the transverse direction and the first segment of the second belt end is arranged spaced apart from the second segment of the second belt end by the recess in the transverse direction. This allows the properties and advantages described above to be implemented especially effectively.

According to an advantageous embodiment of the belt according to the first and/or second aspect of the invention, the first segment of the first belt end has a first average segment width in the transverse direction, wherein the recess between the first segment of the first belt end and the second segment of the first belt end has a first average recess width in the transverse direction which is smaller than the first segment width. At the belt ends, the force transmission in the longitudinal direction of the belt can only take place via the segments of the belt ends. The smaller the recesses or the material interruptions, the greater the forces that can be transmitted in the longitudinal direction via the segments of the belt ends. By making the first segment wider than the recess between the first and second segments, a large force transmission in the longitudinal direction can be ensured. This is especially true if the first and second segments are of the same width.

According to an advantageous embodiment of the belt according to the first and/or second aspect of the invention, the first segment width is between 1450 mm and 1550 mm, preferably between 1100 mm and 1180 mm, especially preferably between 520 mm and 590 mm, more preferably between 350 mm and 390 mm. The second segment of the first belt end can have a second average belt width in the transverse direction. The first segment of the second belt end can have a third average segment width in the transverse direction. The second segment of the second belt end can have a fourth average segment width in the transverse direction. The second, third and fourth segment widths can each correspond to the first segment width. This means that opposing segments can have the same width.

According to an advantageous embodiment of the belt according to the first and/or second aspect of the invention, the first recess width is between 5 mm and 50 mm, preferably between 10 mm and 30 mm, especially preferably 20 mm. The recess between the first segment of the second belt end and the second segment of the second belt end can have a second average recess width in the transverse direction. Preferably, the first and second recess widths are of at least substantially the same width. The first and/or second recess width are significantly smaller compared to the first segment width or the third segment width. This allows an especially high force transmission in the longitudinal direction of the belt.

According to an advantageous embodiment of the belt according to the first and/or second aspect of the invention, the first recess width is at most 50% of the first segment width, preferably at most 25% of the first segment width, especially preferably at most 10% of the first segment width. The same may apply to the second recess width in relation to the third segment width. The first and/or second recess width is thus sensibly limited in order to allow the high force transmission in the longitudinal direction of the belt.

According to an advantageous embodiment of the belt according to the first and/or second aspect of the invention, the first recess width is at least 2% of the first segment width, preferably at least 5% of the first segment width or especially preferably at least 10% of the first segment width. The same can apply for the second recess width in relation to the third segment width.

According to an advantageous embodiment of the belt according to the first and/or second aspect of the invention, the first segment of the first belt end and the second segment of the first belt end have at least substantially the same width in the transverse direction. Thus, a symmetrical connection between the first belt end and the second belt end can be established. Furthermore, this embodiment allows for a common, continuous material interruption between the first and second belt ends.

According to an advantageous embodiment of the belt according to the first and/or second aspect of the invention, the first segment of the second belt end has a second average segment width in the transverse direction, wherein the recess between the first segment of the second belt end and the second segment of the second belt end has a second average recess width in the transverse direction which is smaller than the second segment width. The advantages and technical effects already explained in conjunction with the first segment width are referred to in an analogous manner for this embodiment.

According to an advantageous embodiment of the belt according to the first and/or second aspect of the invention, it is provided that the first segment of the first belt end and the first segment of the second belt end are at least substantially of the same width in the transverse direction, and that the second segment of the first belt end and the second segment of the second belt end are at least substantially of the same width in the transverse direction. This embodiment can also ensure a symmetrical connection between the belt ends and can allow the common, continuous material interruption. Furthermore, a symmetrical distribution of the forces acting in the longitudinal direction can be ensured, which at least supports good concentricity.

According to an advantageous embodiment of the belt according to the first and/or second aspect of the invention, the first recess width and the second recess width are at least substantially of the same width in the transverse direction.

The previously mentioned advantages and technical effects apply to this embodiment in an analogous manner.

According to an advantageous embodiment of the belt according to the first and/or second aspect of the invention, the recess or recesses has/have a circular widening in the longitudinal direction at least on one side, preferably on both sides, at the end of their extension. This allows forces to be better distributed within the belt or within the material of the belt. This can help to avoid force peaks that can lead to stresses on the belt or its material and that might damage it.

According to an advantageous embodiment of the belt according to the first and/or second aspect of the invention, the particular belt end is formed by a belt body. In other words, the particular belt end is in itself free of connecting and/or reinforcing elements, so that the particular connection element, which may preferably comprise a plurality of hooks per belt end and/or per segment end as well as a rigid coupling element arranged in the transverse direction, such as a rod, may be arranged directly on the belt end and/or on the material of the belt end and/or the segment end and/or on its body. This can minimise the number of elements per belt, which can reduce costs in terms of material and assembly.

According to an advantageous embodiment of the belt according to the first and/or second aspect of the invention, the connection elements are arranged in each case partially at each belt end, are fixedly connected to the corresponding belt end and are rotatable about the axis of the transverse direction. In this way, at least some of the aspects described above can be implemented.

According to an advantageous embodiment of the belt according to the first and/or second aspect of the invention, at least one connection element, preferably all connection elements, is/are formed as a hook connection. This allows the previously described properties and advantages of hook connections to be utilised.

According to an advantageous embodiment of the belt according to the first and/or second aspect of the invention, at least one connection element, preferably all connection elements, is/are formed as an integrally bonded connection, preferably as a vulcanisation connection. In this way, the previously described properties and advantages of integrally bonded connections can be utilised.

The third aspect of the invention relates to a belt system, preferably a round baler, with at least one belt according to the first or second aspect of the invention and/or one of the associated advantageous embodiments. In this way, the previously described properties and advantages can be used in a belt system. These properties and advantages can be especially applied to a round baler as described at the outset.

Figure 1:
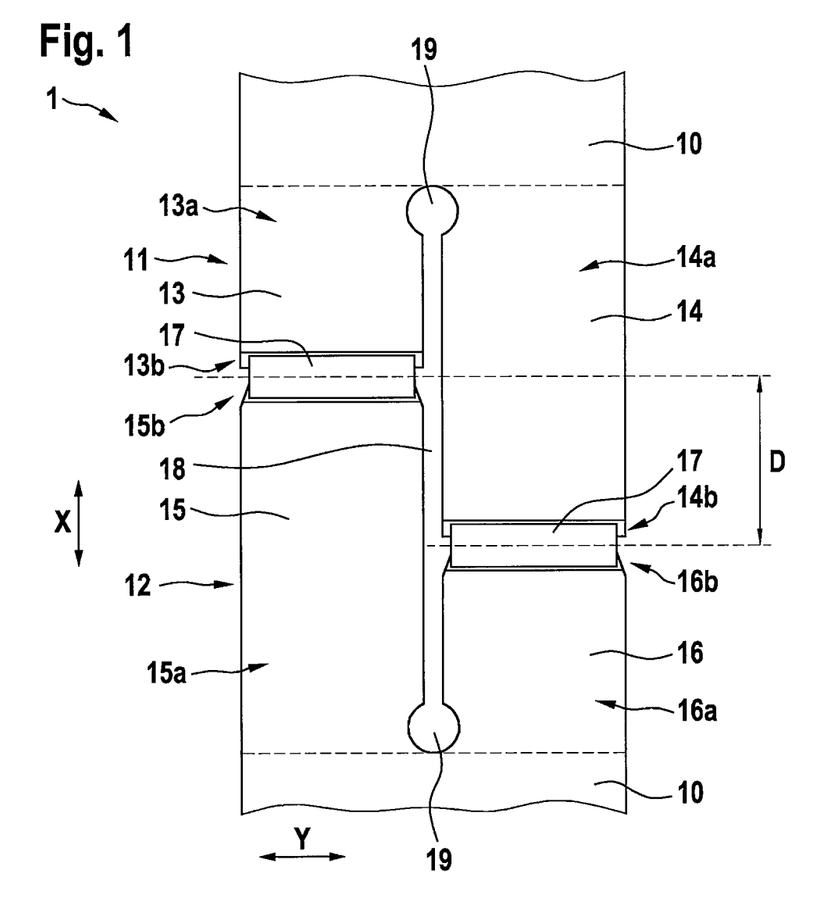
FIG. 1 a schematic top view of a belt according to the invention in accordance with a first exemplary embodiment according to the first aspect of the invention.
Figure 2:
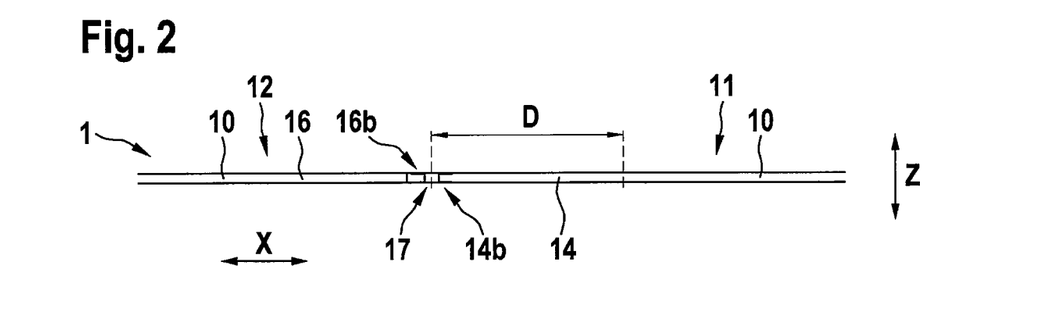
FIG. 2 a schematic side view of the belt according to the invention from FIG. 1.

FIG. 1 shows a schematic top view of a belt 1 according to the invention in a first exemplary embodiment. FIG. 2 shows a schematic side view of the belt 1 according to the invention from FIG. 1. The belt 1 can be used especially in a round baler (2) and is then referred to as a pressing belt 1 or also as a round-baler pressing belt 1.

The belt 1 extends substantially in the longitudinal direction X, which is also the direction of movement of the belt 1 in operation. In the transverse direction Y, the belt 1 extends more than 0.15 times its longitudinal extension. In height Z the belt 1 is comparatively small; see FIGS. 1 and 2.

The belt 1 has a belt body 10 which comprises substantially an elastomeric material in which a tension member in the form of a textile fabric (not shown) running in the longitudinal direction X is embedded. Alternatively, steel ropes or other elongated elements, such as threads, cords and the like, made of synthetic fibres and/or natural fibres can be used as tension members.

In the open state, i.e in the non-endlessly closed state, the belt 1 or belt body 10 thereof has two belt ends 11, 12, which are rectilinear in the transverse direction Y. In the longitudinal direction X, the first belt end 11 merges into a first segment 13 and into a second segment 14 (shown by dashed lines), which are arranged parallel to one another in the longitudinal direction X. Correspondingly, in the longitudinal direction X, the second belt end 12 merges into a first segment 15 and into a second segment 16 (shown by dashed lines), which are also arranged parallel to each other in the longitudinal direction X.

The first segment 13 of the first belt end 11 has a first segment body 13a of the first belt end 11, which ends in the longitudinal direction X with a first segment end 13b of the first belt end 11. The second segment 14 of the first belt end 11 accordingly has a second segment body 14a of the first belt end 11, which ends in the longitudinal direction X with a second segment end 14b of the first belt end 11. The two segments 13, 14 of the first belt end 11 or its segment body 13a, 14a or its segment ends 13b, 14b extend over different distances here in the longitudinal direction X from the continuous belt body 10 of the first belt end 11 to the second belt end 12. As a result, the segment ends 13b, 14b of the first belt end 11 have an offset D in the longitudinal direction X relative to each other.

Likewise, the first segment 15 of the second belt end 12 has a first segment body 15a of the second belt end 12, which ends in the longitudinal direction X with a first segment end 15b of the second belt end 12. The second segment 16 of the second belt end 12 has a second segment body 16a of the second belt end 12, which ends in the longitudinal direction X with a second segment end 16b of the second belt end 12. The two segments 15, 16 of the second belt end 12 or segment body 15a, 16a thereof or segment ends 15b, 16b thereof extend over different distances in the longitudinal direction X from the continuous belt body 10 of the second belt end 12 to the first belt end 11. As a result, the segment ends 15b, 16b of the second belt end 12 have the same offset D in the longitudinal direction X to each other as the segment ends 13b, 14b of the first belt end 11.

The first segment 13 of the first belt end 11 is connected to the first segment 15 of the second belt end 12 in the longitudinal direction X by means of a connection element 17.

The connection element 17 is designed as a hook connection 17 (not shown in detail). Likewise, the second segment 14 of the first belt end 11 is connected to the second segment 16 of the second belt end 12 by means of a further connection element 17.

In the transverse direction Y between the first segment 13 of the first belt end 11, the first segment 15 of the second belt end 12 and the connection element 17 thereof on the one side and the second segment 14 of the first belt end 11, the second segment 16 of the second belt end 12 and the connection element 17 thereof on the opposite side, a material interruption 18 in the longitudinal direction X in the form of a common recess 18 extends centrally in the transverse direction Y, so that the two first segments 13, 15 of the two belt ends 11, 12 and the two second segments 14, 16 of the two belt ends 11, 12 run parallel to each other in the longitudinal direction X and separated from one another in the transverse direction Y by the recess 18. The two ends of the common recess 18 each have a circular widening 19 here, which serves to distribute the force flow more evenly at this point.

The segmentation of the two belt ends 11, 12 in each case into two parallel segments 13, 14, 15, 16 and, especially, the common recess 18 between the segments 13, 14, 15, 16 can allow the belt 1 to deflect under external influences in this region. Especially, in the case of comparatively wide belts 1, the behaviour of belts 1 that are half as wide can be achieved in this region. This can increase the longevity of the belt 1, especially in the case of comparatively wide belts.

Due to the simultaneous offset D in the longitudinal direction X, it can also be achieved that the two connection elements 17 come into contact with a roller of a belt system (not shown) at different times during operation, so that the forces or pulses thus acting on the belt 1 are lower in each case and can occur at different times and thus can be lower for the belt 1. This can also increase the longevity of the belt 1.

Selecting the offset D in such a way that, in operation, only one of the two connection elements 17 at a time can be in contact with a roller of the belt system can further enhance the previously described properties and advantages.

Figure 3:
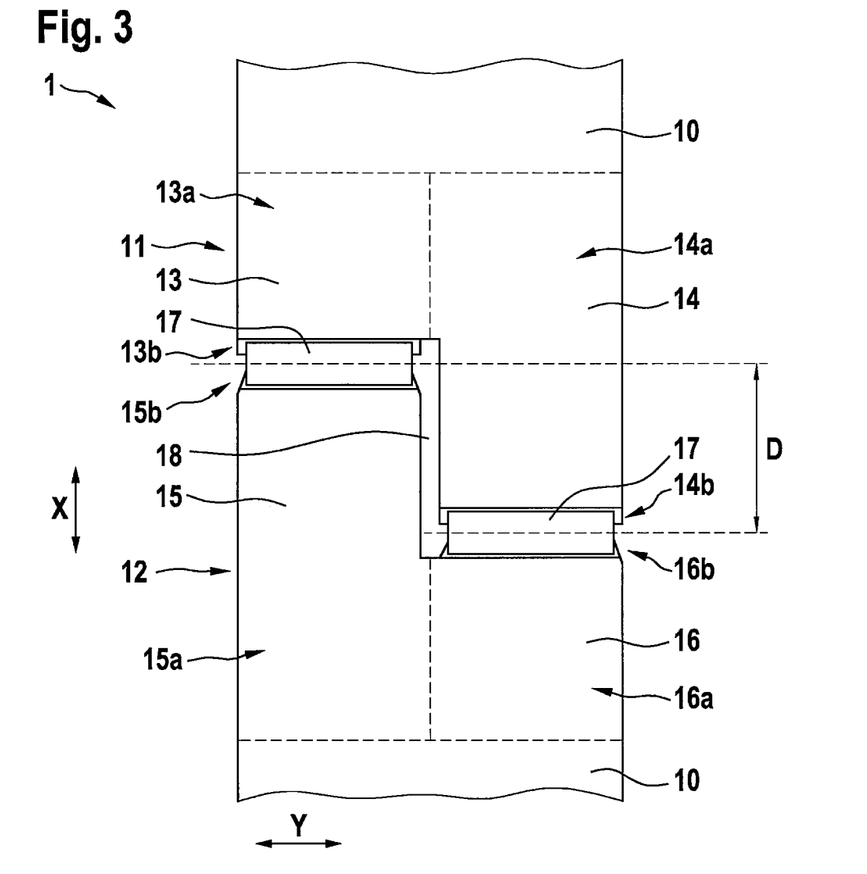
FIG. 3 a schematic top view of a belt according to the invention according to a second exemplary embodiment.

FIG. 3 shows a schematic top view of a belt 1 according to the invention in accordance with a second exemplary embodiment. Here the belt 1 of the second exemplary embodiment according to FIG. 3 differs from the belt 1 of the first exemplary embodiment according to FIG. 1 only in that, in the belt 1 of the second exemplary embodiment according to FIG. 3, the first segment 13 of the first belt end 11 and the second segment 14 of the first belt end 11 are not separated from each other in the transverse direction Y by a recess 18. This applies accordingly to the first segment 15 of the second belt end 12 and the second segment 16 of the second belt end 12. Rather, the recess 18 only extends between the second segment 14 of the first belt end 11 and the first segment 15 of the second belt end 12. This can simplify and accelerate the implementation. It can also save effort and thus costs.

Figure 4:
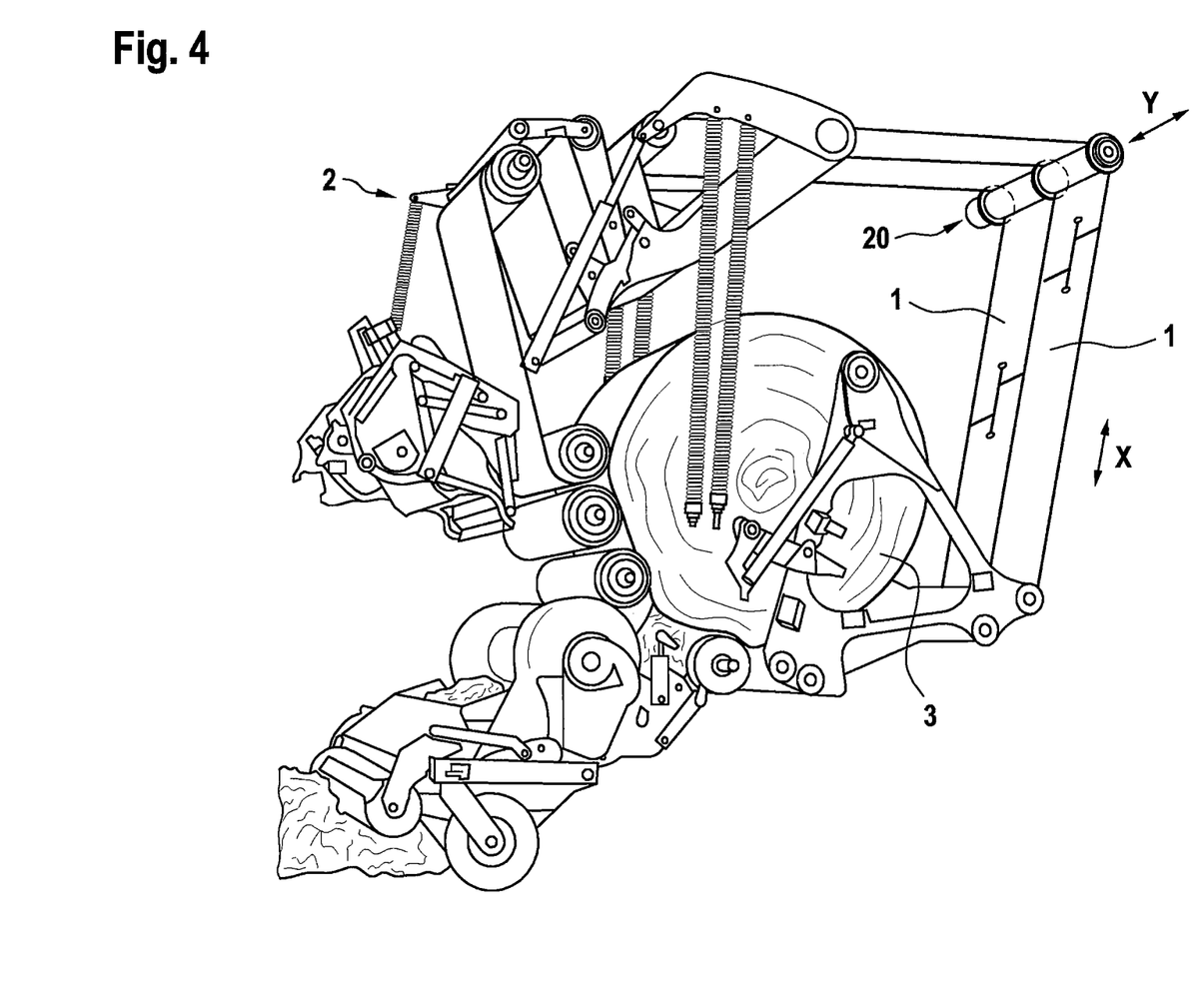
FIG. 4 a schematic perspective view of a belt system in the form of a round baler with two belts according to the invention in accordance with the first exemplary embodiment.

FIG. 4 shows a schematic perspective view of a belt system 2 in the form of a round baler 2 with two belts 1 according to the invention in accordance with the first exemplary embodiment. The two belts 1 run parallel to each other within the round baler 2 and can jointly receive harvested material, such as hay, between them in order to press therefrom a round bale 3.

As described above, the hook connections 17 are offset from each other in the longitudinal direction X as the direction of movement of the belt 1 during operation, so that only one of the two hook connections 17 of a belt 1 can at any time come into contact with one of the rollers 20 belonging to a roller guide 20 of the round baler 2.

Furthermore, the two belts 1 are arranged with their hook connections 17 offset from each other in the longitudinal direction X in such a way that, also due to this arrangement, only one of the total of four hook connections 17 of both belts 1 can come into contact with one of the rollers 20 at any time. In this way, the previously described aspect of a belt 1 according to the invention can also be transferred to the arrangement of a plurality of belts 1 according to the invention.

Figure 5:
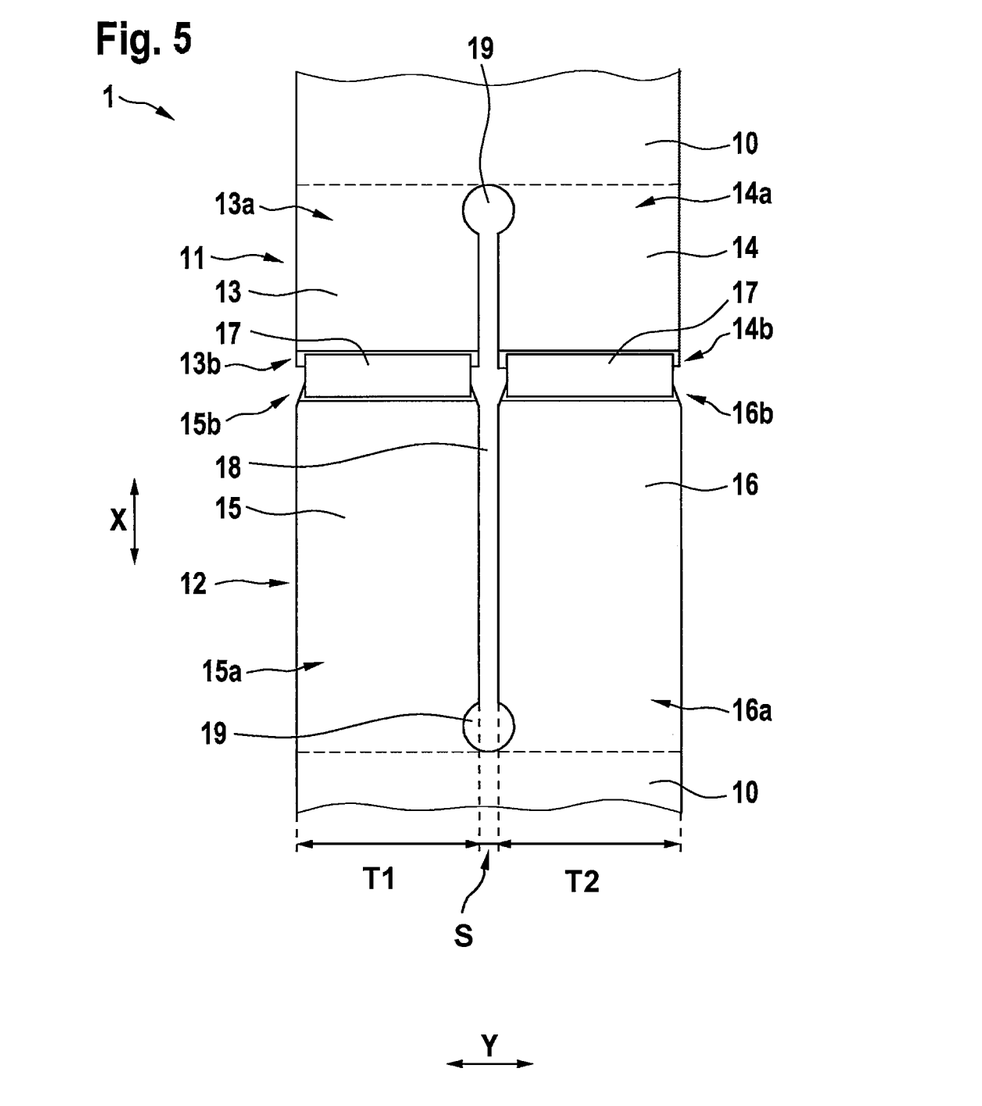
FIG. 5 a schematic top view of a belt according to the invention in accordance with a first exemplary embodiment according to the second aspect of the invention.

FIG. 5 shows a schematic top view of a belt 1 according to the invention in a further exemplary embodiment. The belt 1 from FIG. 5 corresponds here to the belt according to the first exemplary embodiment shown in FIG. 1, with the exception that the segments 13, 14 and the segments 15, 16 are not offset in the longitudinal direction X. Rather, in the exemplary embodiment shown in FIG. 5, it is provided that the first segment 13 of the first belt end 11 is offset-free in the longitudinal direction X relative to the second segment 14 of the first belt end 11, and that the first segment 15 of the second belt end 12 is arranged offset-free in the longitudinal direction X relative to the second segment 16 of the second belt end 12. The first segment 13 of the first belt end 11 has a first segment body 13a of the first belt end 11, which first segment body ends in the longitudinal direction X with a first segment end 13b of the first belt end 11. The second segment 14 of the first belt end 11 correspondingly has a second segment body 14a of the first belt end 11, which second segment body ends in the longitudinal direction X with a second segment end 14b of the first belt end 11. The two segments 13, 14 of the first belt end 11 or segment body 13a, 14a thereof or segment ends 13b, 14b thereof extend here over the same distance in the longitudinal direction X from the continuous belt body 10 of the first belt end 11 to the second belt end 12. As a result, the segment ends 13b, 14b of the first belt end 11 are not offset from one another in the longitudinal direction X, and instead the segment ends 13b, 14b are arranged in alignment in the transverse direction Y.

Likewise, the first segment 15 of the second belt end 12 has a first segment body 15a of the second belt end 12, which first segment body ends in the longitudinal direction X with a first segment end 15b of the second belt end 12. The second segment 16 of the second belt end 12 correspondingly has a second segment body 16a of the second belt end 12, which second segment body ends in the longitudinal direction X with a second segment end 16b of the second belt end 12. The two segments 15, 16 of the second belt end 12 or segment body 15a, 16a thereof or segment ends 15b, 16b thereof extend here over the same distance in the longitudinal direction X from the continuous belt body 10 of the second belt end 12 towards the first belt end 11. As a result, the segment ends 15b, 16b of the second belt end 12 do not have an offset D in the longitudinal direction X relative to one another, and instead the segment ends 15b, 16b are aligned in the transverse direction Y.

The segmentation of the two belt ends 11, 12 in each case into two parallel segments 13, 14, 15, 16 and especially the common recess 18 between the segments 13, 14, 15, 16 can enable the belt 1 to deflect in this region under external influences.

Especially, in the case of comparatively wide belts 1, the behaviour of belts 1 that are half as wide can be achieved in this region. This can increase the longevity of the belt 1, especially in the case of comparatively wide belts.

LIST OF REFERENCE SIGNS (PART OF THE DESCRIPTION)

D offset between connection elements 17 in longitudinal direction X
X longitudinal direction; depth
Y transverse direction; width
Z vertical direction; height
1 belt; pressing belt; round-baler pressing belt
10 (elastomeric) belt body
11 first belt end
12 second belt end
13 first segment of the first belt end 11
13a first segment body of the first belt end 11
13b first segment end of the first belt end 11
14 second segment of the first belt end 11
14a second segment body of the first belt end 11
14b second segment end of the first belt end 11

15 first segment of the second belt end 12
15a first segment body of the second belt end 12
15b first segment end of second belt end 12
16 second segment of the second belt end 12
16a second segment body of the second belt end 12
16b second segment end of second belt end 12
17 connection elements; hook connections
18 (common) material interruption; (common) recess
19 circular widenings of the material interruption 18
2 belt system; round baler
20 roller guide; rollers
3 round bale

The invention claimed is:

1. A belt comprising:
a first belt end and
a second belt end,
wherein the two belt ends are connected to each other,
wherein the first belt end has at least one first segment and one second segment,
wherein the second belt end has at least one first segment and one second segment,
wherein the first segment of the first belt end is connected to the first segment of the second belt end by means of at least one connection element, and
wherein the second segment of the first belt end is connected to the second segment of the second belt end by means of at least one further connection element,
wherein the first segment of the first belt end is arranged offset in some sections in a longitudinal direction relative to the second segment of the first belt end, and in the longitudinal direction relative to the second segment of the second belt end, wherein
the first segment of the first belt end and the second segment of the first belt end are separated from one another in a transverse direction by a material interruption, and/or in that
the first segment of the second belt end and the second segment of the second belt end are separated from one another in the transverse direction by a material interruption.

2. The belt according to claim 1, wherein the connection element between the first segments of the two belt ends is arranged offset in the longitudinal direction by a predetermined amount relative to the connection element between the second segments of the two belt ends.

3. The belt according to claim 1, wherein the first segment of the first belt end is exclusively connected to the first segment of the second belt end, and in that the second segment of the first belt end is exclusively connected to the second segment of the second belt end.

4. The belt according to claim 1, wherein the segments of the first belt end and the segments of the second belt end are separated from one another by a common material interruption.

5. The belt according to claim 1, wherein the material interruption or material interruptions is/are formed as a recess or recesses.

6. The belt according to claim 5, wherein the first segment of the first belt end is arranged spaced apart from the second segment of the first belt end by the recess in the transverse direction, and in that the first segment of the second belt end is arranged spaced apart from the second segment of the second belt end by the recess in the transverse direction.

7. The belt according to claim 6, wherein the first segment of the first belt end has a first average segment width in the transverse direction, wherein the recess between the first segment of the first belt end and the second segment of the first belt end has a first average recess width in the transverse direction which is smaller than the first segment width.

8. The belt according to claim 7, wherein the first segment width is between 1450 mm and 1550 mm.

9. The belt according to claim 7, wherein the first recess width is between 5 mm and 50 mm.

10. The belt according to claim 7, wherein the first recess width is at most 50% of the first segment width.

11. The belt according to claim 7, wherein the first recess width is at least 2% of the first segment width.

12. The belt according to claim 7, wherein the first segment of the first belt end and the second segment of the first belt end are of at least substantially the same width in the transverse direction.

13. The belt according to claim 5, wherein the recess or recesses has/have a circular widening in the longitudinal direction at least on one side at the end of their extension.

14. The belt according to claim 1 wherein the material interruption or material interruptions is/are formed as a recess or recesses, between the two belt ends.

15. The belt according to claim 7, wherein the first segment width is between 350 mm and 390 mm and the first recess width is between 10 mm and 30 mm.

16. The belt according to claim 7, wherein the first recess width is at most 10% of the first segment width.

17. The belt according to claim 7, wherein the first recess width is at least 10% of the first segment width.

18. The belt according to claim 5, wherein the recess or recesses has/have a circular widening in the longitudinal direction at the end of both sides of their extension.

19. A belt comprising:
a first end and
a second belt end,
wherein the two belt ends are connected to each other,
wherein the first belt end has at least one first segment and one second segment,
wherein the second belt end has at least one first segment and one second segment,
wherein the first segment of the first belt end is connected to the first segment of the second belt end by means of at least one connection element, and
wherein the second segment of the first belt end is connected to the second segment of the second belt end by means of at least one further connection element,
wherein the first segment of the first belt end is arranged offset-free in a longitudinal direction relative to the second segment of the first belt end,
wherein the first segment of the second belt end is arranged offset-free in the longitudinal direction relative to the second segment of the second belt end, wherein
the first segment of the first belt end and the second segment of the first belt end are separated from one another in a transverse direction by a material interruption, and/or in that
the first segment of the second belt end and the second segment of the second belt end are separated from one another in the transverse direction by a material interruption,
wherein the respective material interruption of the first belt end and the second belt end only extends in the longitudinal direction over a part of the length of the belt, and wherein the material interruption of the first belt end is formed as a recess between the first segment and the second segment of the first belt end or the material interruption of the second belt end is formed as a recess between the first segment and the second segment of the second belt end.

20. A round baler including at least one belt, said belt comprising:
   a first belt end and a second belt end,
   wherein the two belt ends are connected to each other,
   wherein the first belt end has at least one first segment and one second segment,
   wherein the second belt end has at least one first segment and one second segment,
   wherein the first segment of the first belt end is connected to the first segment of the second belt end by means of at least one connection element, and
   wherein the second segment of the first belt end is connected to the second segment of the second belt end by means of at least one further connection element,
   wherein the first segment of the first belt end is arranged offset in some sections in a longitudinal direction relative to the second segment of the first belt end, and in the longitudinal direction relative to the second segment of the second belt end, wherein
   the first segment of the first belt end and the second segment of the first belt end are separated from one another in a transverse direction by a material interruption, and/or in that
   the first segment of the second belt end and the second segment of the second belt end are separated from one another in the transverse direction by a material interruption.

21. A belt comprising
   a first end and
   a second belt end,
   wherein the two belt ends are connected to each other,
   wherein the first belt end has at least one first segment and one second segment,
   wherein the second belt end has at least one first segment and one second segment,
   wherein the first segment of the first belt end is connected to the first segment of the second belt end by means of at least one connection element, and
   wherein the second segment of the first belt end is connected to the second segment of the second belt end by means of at least one further connection element,
   wherein the first segment of the first belt end is arranged offset-free in a longitudinal direction relative to the second segment of the first belt end,
   wherein the first segment of the second belt end is arranged offset-free in the longitudinal direction relative to the second segment of the second belt end,
   wherein the first segment of the first belt end and the second segment of the first belt end are separated from one another in a transverse direction by a material interruption, and in that the first segment of the second belt end and the second segment of the second belt end are separated from one another in the transverse direction by a material interruption,
   wherein the respective material interruption of the first belt end and the second belt end only extends in the longitudinal direction over a part of the length of the belt, and
   wherein the material interruption of the first belt end is formed as a recess between the first segment and the second segment of the first belt end and the material interruption of the second belt end is formed as a recess between the first segment and the second segment of the second belt end.

* * * * *